Aug. 7, 1945.   E. E. HOWE   2,381,747
TOOL FOR FORMING JOINTS
Filed Nov. 2, 1942   2 Sheets-Sheet 2
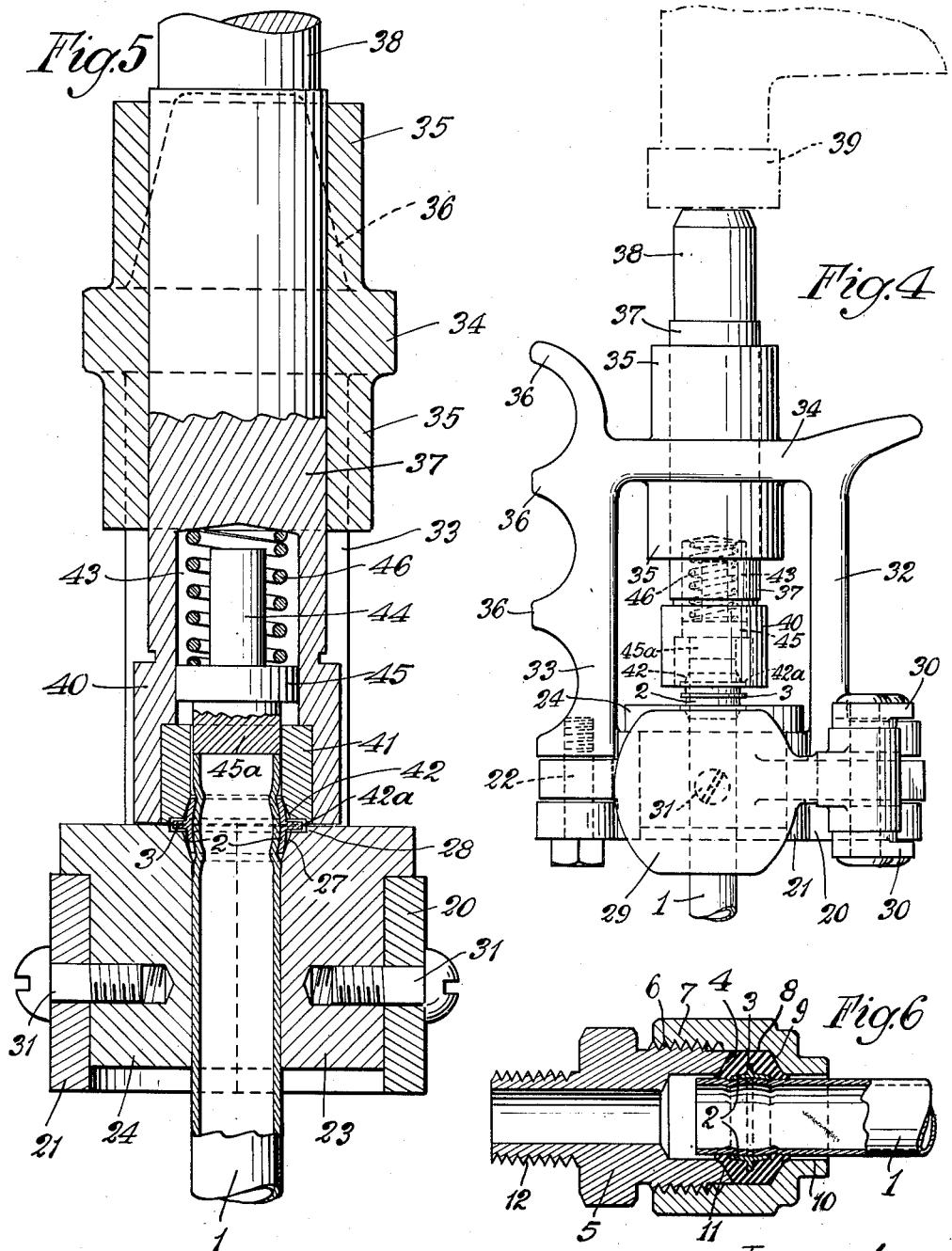
Inventor
Earl E. Howe
by Parker Hunter
Attorneys.

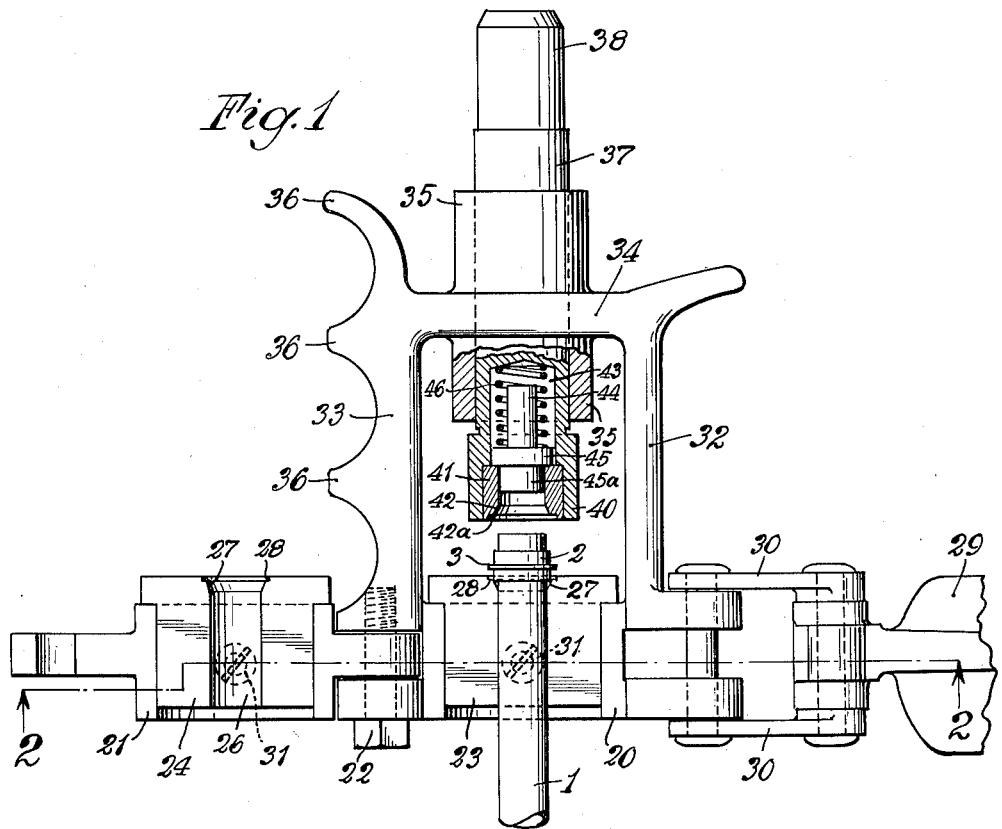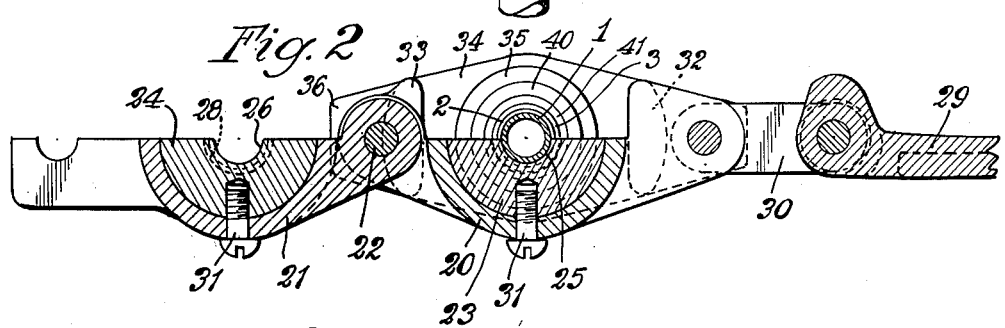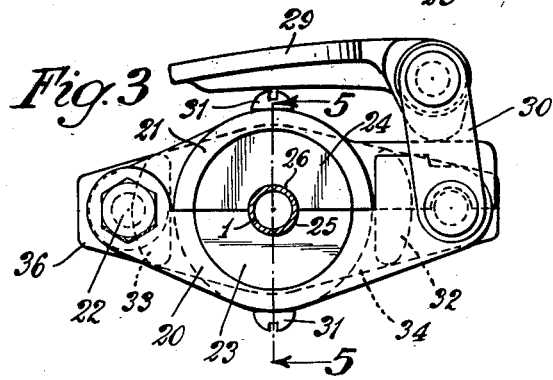

Patented Aug. 7, 1945

2,381,747

UNITED STATES PATENT OFFICE 2,381,747

TOOL FOR FORMING JOINTS

Earl E. Howe, Chicago, Ill., assignor to Chicago Forging & Manufacturing Company, Chicago, Ill., a corporation of Illinois Application November 2, 1942, Serial No. 464,183

9 Claims. (Cl. 81—3)

My invention relates to an improved joint or connection for tubing and the like, and an improved method for forming such joints, and to a tool employed in connection with such method.

One purpose is the provision of an improved joint which is leakproof at all ordinary pressures and is adapted to stand up under exceedingly high excess pressures.

Another purpose is the provision of a joint which may be applied readily in the field.

Another purpose is the provision of a method of forming such a joint.

Another purpose is the provision of a tool for assisting in the formation of such a joint.

Other purposes will appear from time to time in the course of the specification and claims.

The present application is a continuation in part of my co-pending application Serial No. 416,235, filed in the United States Patent Office on October 23, 1941, which issued on the 10th of November, 1941, as Patent #2,301,280.

I illustrate my invention more or less diagrammatically in the accompanying drawings wherein:

Fig. 1 is a plan view illustrating the tool with a tube end in position and the tool open;

Fig. 2 is a section on the line 2—2 of Fig. 1;

Fig. 3 is an end view of the tool, with the tool closed about the end of a tube;

Fig. 4 is a plan view illustrating the tool closed and the operating portions of the tool in position;

Fig. 5 is a section on the line 5—5 of Fig. 3, with the parts in the forming position; and Fig. 6 is an axial section through the final joint.

Like parts are indicated by like symbols throughout the specification and drawings.

Referring to the drawings, it will be understood that the final joint is formed by a tube 1 having a ferrule 2, applied adjacent the end of the tube, the ferrule having a rib 3 extending outwardly therefrom. Surrounding the rib and ferrule and the adjacent portions of the tube is a washer 4 of rubber or other suitable substance. It will be understood that in the final joint, which resembles the joint shown in my co-pending application Serial No. 416,235, filed on October 23, 1941, the pressure chamber surrounds the washer 4. In the joint of Fig. 6 this pressure chamber is formed by a fitting 5 exteriorly screw threaded as at 6 to receive the interiorly screw threaded locking member 7, which is shown as having a generally cylindrical inner wall 8 and a tapered end wall 9, terminating in an aperture 10 of slightly greater diameter than the outside diameter of the tube 1. The fitting 5 has a tapered end wall 11.

When the members 5 and 7 are relatively rotated in the proper direction, they are compressed to form a pressure chamber which is entirely filled by the washer 4. The clearance between the inner bores of the members 5 and 7 is insufficient to permit any substantial escape or outward squeezing of the rubber, but the fit is sufficiently loose to permit ready application and removal. It will be understood that rubber or any suitable rubber substitute may be employed, the washer being preferably flexible and compressible, but not so soft as to be readily extruded through the above mentioned clearance spaces.

The fitting 5 may at its outer end be exteriorly screw threaded, as at 12, but it will be understood that the means for securing it to an adjacent tube, container, or the like, may be varied to suit the particular circumstances involved.

In the formation of the joint the ferrule 2 is secured to the end of the tube 1. It will be understood that preferably the tube is of thin gauge stock and to some extent flexible. The ferrule is slipped over the end of the tube, the ferrule being preferably snugly fitted to the tube, but not so snugly as to resist axial relative movement. The tube with the ferrule on it is then seated in the tool described below, and the annular portion of the ferrule is compressed and driven slightly into the face of the tube 1 to provide a preferably slight interlock. A variant method is to form a rib integrally on the tube, for example, by deforming the tube. Another method is to secure a rib directly to the tube, without a ferrule to carry it.

Thereafter the tube with the ferrule now attached to it is removed from the tool, and the washer 4 is placed thereabout; or the washer is placed about the integral rib, or directly secured rib, above described. The annulus 7, which should be slipped on the tube before the ferrule is applied, or before the integral rib is formed, is then moved against or about the washer, and the parts 5 and 7 are screwed together. They are screwed with sufficient force to constrain the washer to occupy the entire space in the pressure chamber thus formed. Preferably the height or radial extension of the rib 3 is somewhat greater than the clearance between the tube 1 and the bores of the two members which form the pressure chamber. It is desirable, in any event, that the parts be so proportioned that the portion of the washer between each side of the rib and the opposite end wall of the pressure chamber be directly compressed between the faces thus formed.

It will be understood that the use of a simple washer is practical, but that a split or a segmental ring may be employed. In fact, the rubber or other suitable distortable mass may be applied in a variety of forms or shapes.

The tool includes two hinged shell portions 20 and 21 pivoted to each other as at 22. In each one is a generally cylindrical block or half bushing 23, 24, with a semi-cylindrical bore 25, 26. When the two are in the position in which they are shown in Fig. 3, they, therefore, define a cylindrical bore adapted somewhat loosely to receive the tube 1. Each such half bushing or block is tapered at one edge, as at 27, and has a counter bore 28 adapted to receive the rib 3 when it is in the position in which it is shown in Fig. 5. Any suitable means may be employed for locking the members 20, 21 together, but I illustrate a locking lever 29 pivoted to a pair of links 30, which in turn are pivoted to the end of the member 20 opposite to the pivotal connection 22. Fig. 3 illustrates the parts in closed position. It will be understood that the half bushings 23, 24 may be removably held in position, as by the screws 31.

Extending endwise from the member 20 is a yoke having side elements 32, 33, and an end element 34, carrying hubs 35. The member 33 is formed with finger receiving elements 36 for convenience in use. When the tool is grasped, the palm of the hand keeps the locking lever in locked position.

Slidably mounted in the hubs 35 is a plunger element 37, having an end member 38 adapted to receive the impact of any suitable hammer or tool 39. It has an enlarged inner end 40, in which is received a sleeve 41 having a bore of substantially the same diameter as the bore of the members 23, 24. It is also tapered or enlarged, as at 42, to conform generally to the taper 27 of the members 23, 24, and counter-bored as at 42a to receive the rib 3 of the ferrule 2. The member 37 also has an end bore 43 of a diameter somewhat greater than the bore in the member 41. Movable in this bore 43 is a guide pin 44, having a piston head 45 conforming generally to the shape of the bore 43. A coil spring 46 tends normally to move the head 45 against the inner ends of the member 41, which member 41 may be pressed into or otherwise secured in the end 40 of the plunger 37.

In using the tool, after the ferrule has been slipped on the end of the tube, the tube is positioned in the bore of the members 23, 24, they being thereafter locked together, as shown in Fig. 3. The tube may be thrust in until its end contacts the head 45, or its outward extension 45a, which penetrates the bore of the element 41, and serves as an abutment for positioning the end of the tube. When the parts are thus positioned, with the end of the tube engaging the abutment 45a and the outer edge of the ferrule 2 engaging the member 41, the inner edge of the ferrule at the same time engaging the members 23 and 24, a sharp stroke with the hammer 39 against the end element 38 will force the edges of the ferrule into the metal of the tube 1 and position the parts as shown in Fig. 5. At the same time the tube is not forced back by the stroke because the end of the tube engages the positioning member 45a and that member can move in relation to the plunger 37.

After the stroke the tool is released, the rubber washer is positioned, and the joint can be completed, as shown in Fig. 6.

It will be realized that, whereas I have described and shown a practical and operative embodiment of my invention and the method for carrying it out, nevertheless many changes may be made in the size, shape, number and disposition of parts and in the details and steps of such method without departing from the spirit of my invention. I therefore wish my description and drawings to be taken as in a broad sense illustrative or diagrammatic, rather than as limiting me to my precise showing. For instance, the material of which the washer in the tube is made can be widely varied, and the details of the fittings employed are to be taken as illustrative rather than as restrictive, except insofar as I restrict myself specifically by the terms of the claims. With slight changes, the tool may be employed to extrude or flex a fin of metal outwardly from the body of the tube itself.

The use and operation of my invention are as follows:

I provide a joint which is applicable for securing tubing, for example pressure tubing. It is useful, for example, in the manufacture and operation of airplanes, tanks, engines, pumps, and the like. An advantage of my invention is that the joints can be quickly and easily applied and also quickly and easily broken and re-applied without damage to the parts. A further advantage is that the joints can be made easily in the field, a hand tool being provided for securing the ferrule to the tubing.

Where the joints are made at the factory the ferrule might be secured by other means, for example brazing, welding, or the like, or the rib may be directly secured to the tube, but I find the tool herein described a very convenient and practical way for permitting a user in the field to apply to the end of a tube a ferrule which cooperates with the final joint. The use of an integral rib is also practical.

In order to release the joint, all that is necessary is to unscrew the pressure annulus 7, and thus break the pressure chamber. As the end of the tube 1 penetrates only a very slight distance into the fitting 5, this type of joint is particularly convenient for use in confined spaces such as the interior of a tank. The tube 1 can in that event be laterally flexed out of line with the fitting 5, with a minimum of endwise withdrawal.

I claim:

1. In a tool for securing ferrules to tubing, a removable tube surrounding means having a ferrule engaging portion adapted to engage one edge of a ferrule on the tube, a hammer element apertured to receive the end of the tube, said hammer element including a portion opposed to the opposite edge of the ferrule, and connecting means between the tube surrounding means and the hammer element adapted to guide the hammer element for axial movement toward the end of the tube, in response to an actuating blow upon the hammer element.

2. In a tool for securing ferrules to tubing, a removable tube surrounding means having a ferrule engaging portion adapted to engage one edge of a ferrule on the tube, a hammer element apertured to receive the end of the tube, said hammer element including a portion opposed to the opposite edge of the ferrule, and connecting means between the tube surrounding means and the hammer element adapted to guide the hammer element for axial movement toward the end of the tube, in response to an actuating blow, and a positioning abutment member located in an aperture in the hammer element and adapted to engage the end of the tube, said abutment member being mounted for relative movement in relation to the hammer member.

3. In a tool for securing ferrules to tubing, a removable tube surrounding means having a ferrule engaging portion adapted to engage one edge of a ferrule on the tube, a hammer element apertured to receive the end of the tube, said hammer element including a portion opposed to the opposite edge of the ferrule, and connecting means between the tube surrounding means and the hammer element adapted to guide the hammer element for axial movement toward the end of the tube, in response to an actuating blow, and a positioning abutment member located in an aperture in the hammer element and adapted to engage the end of the tube, said abutment member being mounted for relative movement in relation to the hammer element, and yielding means for normally urging the abutment member toward the end of the tube.

4. In a tool for securing ferrules to tubing, a removable clamp adapted to surround the end of a tube with a ferrule positioned on it, said clamp including an anvil portion adapted to be opposed to one edge of the ferrule, a hammer element mounted on and guided for longitudinal movement in relation to said clamp, said hammer element having a portion adapted to engage the opposite edge of the ferrule, and a portion at the opposite end of the hammer element adapted to receive a blow from an impacting tool.

5. In a tool for securing ferrules to tubing, a removable clamp adapted to surround the end of a tube with a ferrule positioned on it, said clamp including an anvil portion adapted to be opposed to one edge of the ferrule, a hammer element mounted on and guided for longitudinal movement in relation to said clamp, said hammer element having a portion adapted to engage the opposite edge of the ferrule, and a portion at the opposite end of the hammer element adapted to receive a blow from an impacting tool, the clamp having associated therewith a hand grip whereby the clamp and the end of the tube mounted therein can be manually supported and moved by the operator.

6. A tool for applying a ferrule to a tube which includes a tube surrounding means, an anvil mounted on the tube surrounding means and having an inclined face adapted to engage one edge of the ferrule, a hammer guided for movement in relation to the tube surrounding means and having an oppositely inclined face engaging the opposite edge of the ferrule, and means for applying a sharp blow to the hammer and for thereby forcing the opposite edges of the ferrule toward each other and inwardly into the face of the tube.

7. A tool for applying a ferrule to a tube which includes a tube surrounding means, an anvil mounted on the tube surrounding means and having an inclined face adapted to engage one edge of the ferrule, a hammer guided for movement in relation to the tube surrounding means and having an oppositely inclined face engaging the opposite edge of the ferrule, and means for applying a sharp blow to the hammer and for thereby forcing the opposite edges of the ferrule toward each other and inwardly into the face of the tube, said hammer being provided with a bore into which the end of the tube can penetrate, and a stop element adapted to engage the end of the tube yieldingly mounted in said bore.

8. In a tool for securing ferrules to tubing, tube surrounding members and means for removably locking them about an end of a tube, means for simultaneously engaging the opposite edges of the ferrule, while the ferrule is positioned on the tube, and means for engaging one edge of the ferrule being fixed in relation to said tube surrounding members, the means for engaging the opposite edge of the ferrule being movable in relation to said surrounding members, and means for imparting relative approaching movement to the means engaging the opposite edges of said ferrule, for thereby moving said ferrule edges towards each other and into gripping contact with the exterior of the tube.

9. In a tool for securing ferrules to tubing, tube surrounding members and means for removably locking them about an end of a tube, means for simultaneously engaging the opposite edges of the ferrule, while the ferrule is positioned on the tube, the means for engaging one edge of the ferrule being fixed in relation to said tube surrounding members, the means for engaging the opposite edge of the ferrule being movable in relation to said surrounding members, and means for imparting relative approaching movement to the means engaging the opposite edges of said ferrule, for thereby moving said ferrule edges towards each other and into gripping contact with the exterior of the tube, each said edge engaging means having a face inclined to overhang the opposed ferrule edge, said means being thereby adapted, in response to their relative approaching movement, to force the opposite edges of the ferrule inwardly into the exterior of the tube.

EARL E. HOWE.